US008653190B2

(12) United States Patent
Chatterjee et al.

(10) Patent No.: US 8,653,190 B2
(45) Date of Patent: Feb. 18, 2014

(54) CURABLE CYCLIC ANHYDRIDE COPOLYMER/SILICONE COMPOSITION

(75) Inventors: Joon Chatterjee, Bloomington, MN (US); Timothy D. Filiatrault, Maplewood, MN (US); Hae-Seung Lee, Woodbury, MN (US); David S. Hays, Woodbury, MN (US); Naimul Karim, Maplewood, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 338 days.

(21) Appl. No.: 13/204,824

(22) Filed: Aug. 8, 2011

(65) Prior Publication Data

US 2013/0041084 A1 Feb. 14, 2013

(51) Int. Cl.
*C08L 83/08* (2006.01)
*C08F 222/04* (2006.01)

(52) U.S. Cl.
USPC .......... 525/103; 525/100; 525/102; 526/266; 526/270; 526/271; 526/272; 528/38

(58) Field of Classification Search
None
See application file for complete search history.

(56) References Cited

U.S. PATENT DOCUMENTS

| | | | |
|---|---|---|---|
| 2,676,182 A | 4/1954 | Daudt et al. | |
| 3,627,851 A | 12/1971 | Brady | |
| 3,772,247 A | 11/1973 | Flannigan | |
| 3,890,269 A | 6/1975 | Martin | |
| 4,240,916 A | 12/1980 | Rossi | |
| 4,358,573 A | 11/1982 | Verbrugge | |
| 4,503,169 A | 3/1985 | Randklev | |
| 4,609,574 A | 9/1986 | Keryk et al. | |
| 4,619,979 A | 10/1986 | Kotnour et al. | |
| 4,661,577 A | 4/1987 | Jo Lane et al. | |
| 4,707,531 A | 11/1987 | Shirahata | |
| 4,774,310 A | 9/1988 | Butler | |
| 4,843,134 A | 6/1989 | Kotnour et al. | |
| 4,935,484 A | 6/1990 | Wolfgruber et al. | |
| 5,026,890 A | 6/1991 | Webb et al. | |
| 5,091,483 A | 2/1992 | Mazurek et al. | |
| 5,110,890 A | 5/1992 | Butler | |
| 5,214,119 A | 5/1993 | Leir et al. | |
| 5,248,739 A | 9/1993 | Schmidt et al. | |
| 5,262,558 A | 11/1993 | Kobayashi et al. | |
| 5,276,122 A | 1/1994 | Aoki et al. | |
| 5,290,615 A | 3/1994 | Tushaus et al. | |
| 5,302,685 A | 4/1994 | Tsumura et al. | |
| 5,304,607 A * | 4/1994 | Marrion | 525/186 |
| 5,319,040 A | 6/1994 | Wengrovius et al. | |
| 5,461,134 A | 10/1995 | Leir et al. | |
| 5,475,124 A | 12/1995 | Mazurek et al. | |
| 5,512,650 A | 4/1996 | Leir et al. | |
| 5,516,581 A | 5/1996 | Kreckel et al. | |
| 5,792,554 A | 8/1998 | Leir et al. | |
| 6,355,759 B1 | 3/2002 | Sherman et al. | |
| 6,441,118 B2 | 8/2002 | Sherman et al. | |
| 6,531,620 B2 | 3/2003 | Brader et al. | |
| 6,664,359 B1 | 12/2003 | Kangas et al. | |
| 7,090,721 B2 | 8/2006 | Craig et al. | |
| 7,090,722 B2 | 8/2006 | Budd et al. | |
| 7,156,911 B2 | 1/2007 | Kangas et al. | |
| 7,524,545 B2 | 4/2009 | Bany et al. | |
| 7,649,029 B2 | 1/2010 | Kolb et al. | |
| 7,807,268 B2 | 10/2010 | Zhou et al. | |
| 2002/0018951 A1 | 2/2002 | Livengood | |
| 2009/0326151 A1* | 12/2009 | Shimizu et al. | 525/102 |

FOREIGN PATENT DOCUMENTS

| | | |
|---|---|---|
| EP | 0 073 770 | 9/1982 |
| EP | 0 380 236 | 5/1995 |
| JP | 236234 | 2/1990 |
| JP | 2004137411 | 5/2004 |
| JP | 2006213872 | 8/2006 |
| JP | 2008069274 | 3/2008 |
| JP | 2009010097 | 1/2009 |
| WO | WO 95/06691 | 3/1995 |
| WO | WO 97/40103 | 10/1997 |
| WO | WO 98/15602 | 4/1998 |
| WO | WO 01/96011 | 12/2001 |
| WO | WO 03/097757 | 11/2003 |
| WO | WO 2005/065736 | 7/2005 |

OTHER PUBLICATIONS

Machine-generated translation of JP 2004-137411 into the English language.*
Clouet et al., "Macrothiuram Disulfide for the Free Rdical Synthesis of PDMS—Vinyl Triblock Copolymers. I. Syntheses and Polymerization Kinetics," Journal of Polymer Science: Part A: Polymer Chemistry, vol. 31, Issue 13, pp. 3387-3396 (1993).
S. Ranganathan et al., "Peroxide-Initiated Grafting of Maleic Anhydride onto Linear and Branched Hydrocarbons," Journal of Polymer Science: Part A: Polymer Chemistry, vol. 37, Issue 20, pp. 3817-3825, (1999).
Heinen et al., "C NMR Study of the Grafting of Maleic Anhydride onto Polyethene, Polypropene, and Ethene—Propene Copolymers," Macromolecules, vol. 29, Issue 4, pp. 1151-1157 (1996).
Shi et al., "Functionalization of isotactic polypropylene with maleic anhydride by reactive extrusion: mechanism of melt grafting," Polymer, vol. 42, Issue 13, pp. 5549-5557 (2001).
Abbate, et al., "Maleated Polyisobutylene: A Novel Toughener for Unsaturated Polyester Resins," Journal of Applied Polymer Science, vol. 58, Issue 10, pp. 1825-1837, (1995).
Encyclopedia of Polymer Science and Technology, "Silicones," vol. 11, pp. 765-841, Apr. 15, 2003.
PCT International Search Report, PCT/US2012/039083, dated Jul. 2, 2012.

* cited by examiner

*Primary Examiner* — Marc Zimmer
(74) *Attorney, Agent, or Firm* — Kent S. Kokko

(57) ABSTRACT

Disclosed is a curable silicone composition for preparing release layers and pressure sensitive adhesives, and to substrates bearing a layer of the cured composition. More specifically, this invention relates to a silicone composition, curable in the absence of both catalysts and actinic radiation comprising a cyclic anhydride copolymer and an amine-terminated polysiloxane.

17 Claims, No Drawings

CURABLE CYCLIC ANHYDRIDE COPOLYMER/SILICONE COMPOSITION

FIELD OF THE INVENTION

This disclosure relates to a curable silicone composition for preparing release layers and pressure sensitive adhesives, and to substrates bearing a layer of the cured composition. More specifically, this invention relates to a silicone composition, curable in the absence of both catalysts and actinic radiation.

BACKGROUND

As release coating, silicone compositions have been used to render adhesive materials nonadherent to substrates. Such silicone compositions generally comprise a mixture of an ethylenically-unsaturated organopolysiloxane, an organohydrogenpolysiloxane, and a catalyst for the curing of the mixture by means of a hydrosilation reaction.

For example U.S. Pat. No. 4,609,574 discloses a curable silicone coating composition that cures more rapidly at elevated temperatures or cures less rapidly at lower temperatures. This composition comprises (A) a polydiorganosiloxane wherein 90 to 99.5% of all organic groups are methyl and from 0.5 to 10% of all organic groups are selected from vinyl and higher alkenyl groups, (B) an effective amount of a metal hydrosilation catalyst; (C) a methylhydrogenpolysiloxane crosslinking agent compatible with (A) and having an average of at least three silicon-bonded hydrogen atoms per molecule; and (D) an effective amount of an inhibitor for the metal hydrosilation catalyst; and wherein the composition contains 0.8 to 1.5 silicon-bonded hydrogen atoms for every unsaturated group in the composition.

While silicone compositions that provide coatings having low release and fast curing characteristics are known, silicone compositions that provide release coatings which do not require catalysts are sought As pressure-sensitive adhesives, silicone compositions are known. They have a variety of applications because they can possess one or more of the following properties: high thermal stability; high oxidative stability; permeability to many gases; low surface energy; low index of refraction; low hydrophilicity; dielectric properties; biocompatibility; and adhesive properties. Examples of such pressure sensitive adhesives are disclosed in U.S. Pat. No. 5,461,134 (Leir et al.), U.S. Pat. No. 5,512,650 (Leir et al.), U.S. Pat. No. 5,475,124 (Mazurek et al.), U.S. Pat. No. 5,792,554 (Leir et al.), U.S. Pat. No. 6,355,759 (Sherman et al.) as well as WO 98/15602 (Kreckel).

Although silicone pressure sensitive adhesives are known to adhere to a wide variety of substrates, there is still a need for adhesives and adhesive articles, particularly tapes that provide an effective peel strength and shear strength to such substrates, without the need for a catalysts or other chemical or physical surface treatment of the substrate. Further, the composition may be prepared neat or in a solvent, and applied to a substrate using a solvent or hot-melt coated.

SUMMARY

The present disclosure provides a cyclic anhydride copolymer and an diamine-terminated polysiloxane, which may be cured in the absence of conventional silicone catalysts and do not require chemical or physical surface treatment of the substrate. The curable compositions provide novel release coating, and when tackified, pressure-sensitive adhesives.

In one embodiment, the present invention provides an article that includes a substrate (or backing) and a release coating of the instant composition disposed on the substrate comprising the curable composition. Release coatings can be used in adhesive tape rolls, where the tape is wound upon itself and usage requires unwinding of the tape roll. Such release coatings are typically referred to as LABs. Release coatings can also be used as a "liner" for other adhesive articles such as labels or medical dressing bandages, where the adhesive article is generally supplied as a sheet-like construction, as opposed to a roll construction.

In another embodiment the present disclosure provides and adhesive article that includes a substrate (or a backing) and an adhesive coating disposed on the substrate comprising the tackified curable composition.

The release coatings prepared from the curable compositions of this disclosure are characterized by the "release test" and the "readhesion test" described herein.

The pressure-sensitive adhesives prepared from the curable compositions of this disclosure provide the desired balance of tack, peel adhesion, and shear holding power, and further conform to the Dahlquist criteria, i.e., the modulus of the adhesive at the application temperature, typically room temperature, is less than $3 \times 10^6$ dynes/cm at a frequency of 1 Hz.

As used herein

"Alkyl" means a linear or branched, cyclic or acylic, saturated monovalent hydrocarbon having from one to about twelve carbon atoms, e.g., methyl, ethyl, 1-propyl, 2-propyl, pentyl, and the like.

"Alkylene" means a linear saturated divalent hydrocarbon having from one to about twelve carbon atoms or a branched saturated divalent hydrocarbon having from three to about twelve carbon atoms, e.g., methylene, ethylene, propylene, 2-methylpropylene, pentylene, hexylene, and the like.

"Alkenyl" means a linear saturated monovalent hydrocarbon having from one to about twelve carbon atoms or a branched unsaturated hydrocarbon having from three to about twelve carbon atoms.

"Aryl" means a monovalent aromatic, such as phenyl, naphthyl and the like.

"Arylene" means a polyvalent, aromatic, such as phenylene, naphthalene, and the like.

The term "hydrocarbyl" means a saturated or unsaturated linear, branched, cyclic, or polycyclic hydrocarbon group. Unless otherwise indicated, the hydrocarbyl groups typically contain up to 30 carbon atoms, often up to 20 carbon atoms, and even more often up to 10 carbon atoms. This term is used to encompass alkyl, alkenyl, alkynyl groups, as well as cyclic groups such as alicyclic and aromatic groups, for example.

DETAILED DESCRIPTION

The present disclosure provides a curable composition comprising a cyclic anhydride copolymer and a diamine-terminated polysiloxane. The composition, when cured, provides useful release coatings. The disclosure further provides a curable composition comprising a cyclic anhydride copolymer, a diamine-terminated polysiloxane and a tackifier, such as an MQ resin, which when cured, provides pressure-sensitive adhesive compositions. Either of the compositions (tackified or untackified) may further comprise an optional monoamine-terminated polysiloxane. Advantageously, the curable compositions require no additional catalyst or accelerant.

The curable composition includes an diamine-terminated polysiloxane is of the formula

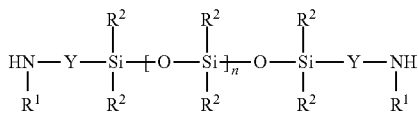

I wherein
each $R^1$ is H, an alkyl or aryl group;
each $R^2$ is an alkyl or aryl group;
each Y is a $C_1$-$C_{10}$ alkylene, and
n is at least 10, preferably 15 to 200, and more preferably 30 to 150.

Useful amine-terminated polysiloxane include any diamine-terminated polysiloxane that fall within Formula I above and include those amine-terminated polysiloxane having molecular weights in the range of about 700 to 150,000 g/mole, preferably from about 10,000 to about 60,000 g/mole, more preferably from about 25,000 to about 50,000 g/mole. Suitable amine-terminated polysiloxane and methods of manufacturing amine-terminated polysiloxane are disclosed in, e.g., U.S. Pat. No. 3,890,269 (Martin); U.S. Pat. No. 4,661,577 (Lane); U.S. Pat. No. 5,026,890 (Webb et al.), U.S. Pat. No. 5,276,122 (Aoki et al.) U.S. Pat. No. 5,512,650 (Leir et al.) U.S. Pat. No. 6,441,118 (Sherman et al) and U.S. Pat. No. 6,664,359 (Melancon et al.); the disclosures of which are incorporated herein by reference.

Examples of useful diamine-terminated polysiloxane include polydimethylsiloxane diamine, polydiphenylsiloxane diamine, polyphenylmethylsiloxane diamine, polydiethylsiloxane diamine, poly(ethyl)methylsiloxane diamine, and mixtures and copolymers thereof.

Suitable diamine-terminated polysiloxanes are commercially available from, for example, Shin Etsu Silicones of America, Inc., Torrance, Calif., and Huls America, Inc. Preferably, the amine-terminated polysiloxanes are substantially pure and prepared as disclosed in U.S. Pat. No. 5,214,119 (Leir et al.). Amine-terminated polysiloxanes having such high purity may be prepared from the reaction of cyclic organosilanes and bis(aminoalkyl)disiloxanes utilizing an anhydrous amino alkyl functional silanolate catalyst such as tetramethylammonium-3-aminopropyldimethyl silanolate, preferably in an amount less than 0.15% by weight based on the weight of the total amount of cyclic organosiloxane with the reaction run in two stages. Particularly useful are amine-terminated polysiloxanes prepared using cesium and rubidium catalysts as disclosed, for example, in U.S. Pat. No. 5,512,650 (Leir et al.). Silicone diamines may also be prepared according to the method described in U.S. Pat. No. 6,531,620 (Brader et al.), the disclosure of which is incorporated herein by reference.

The curable tackified adhesive compositions preferable further comprise a monoamine-terminated polysiloxane (polydiorganosiloxane monoamine), which have been found to improve the tack, and aiding in the processing of the components. In particular, the diamine-terminated polysiloxane and the anhydride copolymer are not mutually soluble, and may required heating or solvent to effect a homogenous solution. It has been found that reacting a portion of the cyclic anhydride groups with the monoamine polysiloxane enhances the solubility and improves the processibility.

Monoamine-terminated polysiloxanes useful in the present invention can be represented by the following formula and include those having number average molecular weights in the range of about 700 to 150,000. The monoamine-terminated polysiloxane may be used in amounts of up to 60 parts by weight, preferably 1 to 30 parts by weight, relative to 100 parts by weight of the diamine-terminated polysiloxane. At higher levels, the shear values are significantly reduced.

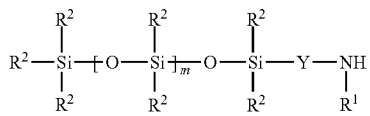

V wherein
each $R^1$ is H, an alkyl or aryl group;
each $R^2$ is an alkyl or aryl group;
each Y is a $C_1$-$C_{10}$ alkylene, and
m is at least 10, preferably 15 to 200, and more preferably 30 to 150.

The monoamine-terminated polysiloxane can be prepared by a variety of methods. A useful means of synthesizing such materials is via a platinum catalyzed hydrosilation reaction of a mono-SiH-terminated polydiorganosiloxane and an alpha-olefinic alkylamine compound. This method is described by Clouet et al. in Journal of Polymer Science: Part A: Polymer Chemistry, Vol. 31, 3387-3396 (1993). Care should be exercised during the preparation of the monoamine-functional polydiorganosiloxane to avoid side reactions which could lead to undesired impurities in the material which will carry over into the final block copolymeric products. For example, —SiH groups may hydrolyze in the presence of water and the platinum catalyst to form silanol groups. These silanol functional polydiorganosiloxanes could be impurities which could adversely affect the elastomeric properties and release characteristics of the curable composition. A discussion of the deleterious effects such silanol terminated species can have in elastomeric silicone-polyurea block copolymers can be found in U.S. Pat. No. 5,290,615 (Tushaus et al.) A preferred means of preparing the monoamine-terminated polysiloxane can be found in U.S. Pat. No. 5,091,483 (Mazurek et al.) or U.S. Pat. No. 6,441,118 (Sherman et al.), each incorporated by reference. This method involves the reaction of cyclic organotrisiloxanes with alkyl lithium reagents in tetrahydrofuran to yield lithium polydiorganosiloxanolates that are subsequently reacted with aminoalkylfluorosilanes as terminating agents to provide the monoamine-terminated polysiloxane product.

Examples of monoamine-terminated polysiloxane useful in the present invention include polydimethylsiloxane monoamine, polydiphenylsiloxane monoamine, polytrifluoropropylmethylsiloxane monoamine, polyphenylmethylsiloxane monoamine, polydiethylsiloxane monoamine, and copolymers and mixtures thereof.

The curable composition further comprises a copolymer containing cyclic anhydride moieties that can react with the amine-terminated silicone, and is generally used in amounts of 0.2 to 30 parts by weight, preferably 1 to 10 parts by weight, relative to 100 parts by weight of the diamine-terminated polysiloxane.

Alternatively, the amounts of the components may be selected such that the molar ratio of the amine groups of the polysiloxane to the cyclic anhydride groups is from 1:1 to 1:3. It has been found that amounts of cyclic anhydride in excess of this range will deleteriously increase the modulus, and haze will increase as the excess anhydride copolymer tends to crystallize and phase separate. These ranges tend to be more significant for release coatings than for adhesive coatings as the MQ tackifiers in the adhesive compositions tend to reduce the deleterious effects of working outside these molar ranges. Amine may be used in excess of this range for adhesive compositions (tackified curable compositions) as it tends to plasticize the cured composition. When preparing adhesive compositions, the molar ratio of the amine groups of the polysiloxane to the cyclic anhydride groups may be from 2:1 to 1:3.

In one embodiment the composition comprises a cyclic anhydride containing copolymer, including free radical addition copolymers and graft copolymers having the monomer units:

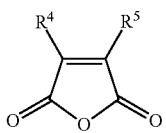

where each $R^4$ and $R^5$ are independently selected from H or $C_1$-$C_4$ alkyl, and $R^4$ and $R^5$ may be taken together to form a ring.

Useful cyclic anhydride monomers include anhydride-containing monomers that also contain double bonds that can undergo free radical polymerisation, for example maleic anhydride, itaconic anhydride, citraconic(methylmaleic) anhydride, ethylmaleic anhydride, 1,2-cyclohexene- and 1,2cyclohexene-4,5-dicarboxylic acid anhydride, of which maleic anhydride is preferred.

The copolymers comprising cyclic carboxylic anhydride groups, e.g. maleic anhydride, include polymers wherein the cyclic anhydride groups are integrated into the polymer chain as well as polymers wherein these groups are present as pendant cyclic carboxylic anhydride groups. The former include copolymers of a monomers having a terminal ethylenically unsaturated bond (such as styrene) and of a cyclic anhydride having an ethylenically unsaturated bond whereas the latter include polymers and copolymers of ethylenically unsaturated monomers having the cyclic anhydride groups as groups pendent from the main polymer chain.

Suitable copolymers of a compound having a terminal ethylenically unsaturated bond and a cyclic carboxylic anhydride monomer unit having an ethylenically unsaturated bond useful in the composition of this invention are described, for example, in U.S. Pat. No. 4,240,916 (Rossi) and U.S. Pat. No. 4,358,573 (Verbrugge). The cyclic carboxylic anhydride can be an alkyl or aryl substituted or unsubstituted cyclic carboxylic anhydride wherein the alkyl groups contain preferably up to 6 carbon atoms each and the cyclic group contains preferably 4 to 15 carbon atoms, such as maleic or itaconic anhydride. Preferred is maleic anhydride. The compound having a terminal ethylenically unsaturated bond is preferably a 1-alkene, styrene, a methylstyrene, a (meth)acrylic acid derivative, such as an acrylic or methacrylic acid ester, or a vinylether. Such monomers can be used alone or as mixtures.

The cyclic carboxylic anhydride can be used in an amount of about 10-70, preferably about 35-70 mol percent. More preferably 45-60 mol percent of ethylenically unsaturated cyclic anhydride is copolymerized with 40-55 mol percent of at least one $C_2$ to $C_{30}$ aliphatic 1-alkene to produce a copolymer such as, e.g., a maleic anhydride/octadecene copolymer, maleic anhydride/decene copolymer, and maleic anhydride/tetradecene copolymer. It is also contemplated to copolymerize 45-60 mol percent of a cyclic carboxylic anhydride with 40-50 mol percent of a vinylether of preferably less than 30 carbon atoms to produce a copolymer such as, e.g. a maleic anhydride/octadecyl vinylether copolymer or maleic anhydride/methylvinylether copolymer. It is further contemplated to copolymerize 45-60 mole percent of a cyclic carboxylic anhydride with 40-55 mol percent styrene to produce, e.g. a maleic anhydride/styrene copolymer.

The copolymers of a compound having a terminal ethylenically unsaturated bond and a cyclic carboxylic anhydride having an ethylenically unsaturated bond preferably used in the invention are composed of subunits of the following formula (II):

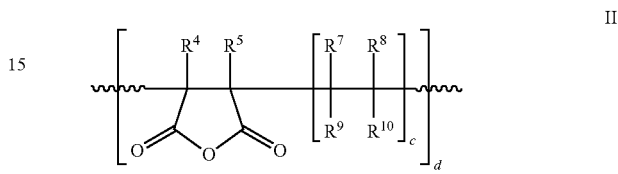

wherein each $R^4$ and $R^5$ are independently selected from H or $C_1$-$C_4$ alkyl, and $R^4$ and $R^5$ may be taken together to form a ring; $R^9$ and $R^{10}$ may be independently selected from hydrogen or hydrocarbyl including alkyl and aryl, $R^7$ and $R^8$ are independently hydrogen or an aliphatic group including alkyl or alkenyl, c is an integer of 1 to 20 and d is an integer greater than 1, which value depends on the molar ratios of the monomers used.

$R^9$ and $R^{10}$ are preferably hydrogen, an alkyl group, an unsubstituted or $C_1$-$C_5$ alkyl substituted phenyl group. If $R^9$ and $R^{10}$ is an alkyl group, it contains preferably up to about 20 carbon atoms, more preferably up to 10 carbon atoms. c is preferably an integer from 50 to 750, and d is preferably at least 1. Generally d is a number such that the copolymer has a $M_w$ in the range of 200 to 40,000 (preferably 1000 to 10000).

With regard to the anhydride copolymer of Formula II, a portion of the anhydride groups may be reacted with a monoamine terminal polysiloxane of Formula V as described supra. Therefore the copolymer of Formula II may further comprise monomer units of the formula:

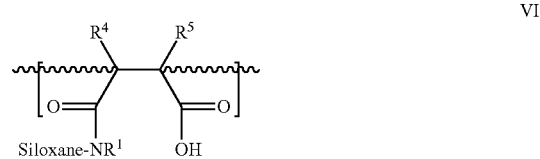

where each $R^4$ and $R^5$ are independently selected from H or $C_1$-$C_4$ alkyl, —NR1-Siloxane represents the residue of the monoamine-terminated polysiloxane of Formula V and subscript s represents the fraction of the anhydride groups so modified.

Suitable polymers having pendant cyclic carboxylic anhydride groups include polyolefins and poly(meth)acrylic acid derivatives such as esters having such groups pendant at the main polymer chain. Specific examples are copolymers of methyl methacrylate (MMA) grafted with maleic anhydride, or polybutadiene polymers grafted with maleic anhydride.

Styrene or substituted styrene monomer may be used. For instance, there may be used α-methylstyrene, or styrene that is further optionally substituted in the benzene ring of the styrene moiety. The styrene may be further substituted by alkyl groups having up to 18 carbon atoms, preferably up to 6 carbon atoms.

Styrene-maleic anhydride copolymers (SMA) are commercially available with maleic anhydride contents up to 50 mol % from Polyscope Polymers under the tradename Xiran, Sartomer under the tradename SMA, and Nova Chemicals under the tradename Dylark.

Other possible unsaturated copolymerisable monomers that may be present, in place of or in addition to styrene, include olefins such as ethylene, conjugated dienes such as 1,3-butadiene and isoprene, alkyl acrylates and methacrylates, especially lower alkyl such as the methyl, ethyl and, preferably, the butyl and ethylhexyl esters, vinyl acetate, acrylonitrile, methacrylonitrile, acrylamides, methacrylamides and unsaturated ethers such as alkyl vinyl ethers, for instance, the methyl and ethyl ethers. Also mentioned are the vinyl sulphoxides and vinyl sulphones. Mixtures of these can be used in the copolymerization to design copolymers that have particular solubility properties and, when reacted with polyamine or polyol, impart particular properties to the membrane formed.

The molecular weight of the cyclic anhydride copolymer may be greater than about 1,000, preferably greater than about 20,000. There is no critical upper limit on the molecular weight of the copolymer, provided that the viscosity does not increase to such an extent that reaction is impeded in the amounts used. Molecular weights greater than about 400,000 are not normally used.

The anhydride-containing copolymer may comprises a grafted anhydride copolymer. In one embodiment the grafted anhydride comprises a polydiene grafted with an anhydride of Formula II supra. The polydienes useful in the present invention include, for example, polybutadienes such as 1,4-polybutadiene, 1,2-polybutadiene, polyisoprene, styrene-butadiene copolymers and block-copolymers and acrylonitrile butadiene copolymers and ethylene-propylene-diene terpolymers. In accordance with the present invention, the polydiene has been grafted with an ethylenically unsaturated dicarboxylic acid anhydride. Example of polybutadiene grafted with maleic anhydride (such as the "Ricon MA" product line from Sartomer and the "Lithene" product line from Synthomer) and combinations thereof.

In some preferred embodiments, the grafted anhydride copolymer comprises an olefin copolymer having grafted anhydride groups, which may be prepared by free radical addition of maleic anhydride to an olefin copolymer. Such free radical addition leads to a complex mixture of anhydride substituted products including hydrogen abstraction products, beta-scission products and free-radical polymerization of the cyclic anhydride monomer. Such complex addition products may be represented by the generalized formula:

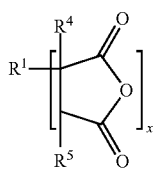

III wherein
$R^1$ represents the polymeric isobutylene having at least 20 repeat units, wherein each $R^4$ and
$R^5$ are independently selected from H or $C_1$-$C_4$ alkyl, and subscript x represents a fraction of those repeat units substituted by the cyclic anhydride. Typically 1 to 5 percent of the repeat units of the isobutylene copolymer will be substituted by cyclic anhydride groups.

As previously described, a portion of the cyclic anhydride groups of the copolymer of Formula III may be reacted with a monoamine-terminated polysiloxane of Formula V as indicated in Formula VI:

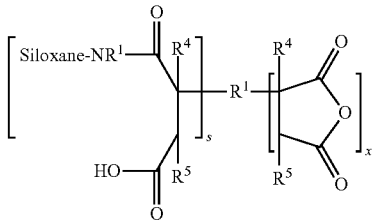

VI

A grafted anhydride polyisobutylene of Formula III may be prepared by free radical addition of maleic anhydride to a halogenated PIBs, including halogenated poly(isobutylene-co-methylstyrene), halogenated poly(isobutylene-co-isoprene) and non-halogenated polyisobutylenes such as butyl rubbers. Such free radical addition of an unsaturated cyclic anhydride monomer will yield a polymer having a pendent succinyl anhydride group.

There are several commercially-available halogenated polyisobutylene, but alternatively a non-halogenated polyisobutylene may be halogenated, then subsequently substituted. The halogen moiety in those materials allows introduction of the pendent ethylenically unsaturated groups. Non-halogenated polyisobutylenes may be likewise functionalized, typically by generating free radicals at the allylic positions of the polymer chain.

The starting copolymers of isobutylene may include those wherein isobutylene is copolymerized with another monomer, which may be subsequently modified to include the pendent group. Synthetic rubbers include butyl rubbers which are copolymers of mostly isobutylene with a small amount of isoprene, for example, butyl rubbers available under the tradenames VISTANEX (Exxon Chemical Co.) and JSR BUTYL (Japan Butyl Co., Ltd.). In some embodiments, the copolymers are substantially homopolymers of isobutylene, for example, polyisobutylene resins, which may be subsequently modified to include the pendent unsaturated group, available under the tradenames OPPANOL (BASF AG) and GLISSOPAL (BASF AG). The copolymers also include copolymers of mostly isobutylene with n-butene or butadiene, which may be subsequently modified to include the pendent unsaturated group. In some embodiments, a mixture of copolymers may be used, i.e., the first polyisobutylene comprises a homopolymer of isobutylene and the second polyisobutylene comprises butyl rubber, or the first polyisobutylene comprises butyl rubber and the second polyisobutylene comprises a copolymer of isobutylene, subsequently modified. Blends of isobutylene homopolymer and modified poly(isobutylene) are also contemplated.

The isobutylene copolymer may comprise a random copolymer of isobutylene and modified para-methylstyrene units, wherein said random copolymer contains 1 to 20% by weight of said modified para-methylstyrene units. This random copolymer is, for example, commercially available from Exxon Chemical Co. under the trade name of EXXPRO series, and examples thereof include MDX90-10, MDX89-4. A portion of the methyl groups at the para-position of this para-methylstyrene can be brominated to form a site for the subsequent free radical initiation and addition to maleic anhydride. Accordingly, a crosslinked structure can be formed by the technique described in detail hereinafter. Particularly, regarding the copolymer MDX90-10, 1.2% by mol of para-methylstyrene, which is contained in the copolymer in the amount of 7.5% by weight, is brominated. Regarding MDX89-4, 0.75% by mol of para-methylstyrene, which is contained in the copolymer in the amount of 5% by weight, is brominated. In addition, bromination of para-methylstyrene and random polymerization between isobutylene and para-methylstyrene, for the purpose of producing a random copolymer, can be performed by known techniques.

Para-methylstyrene monomer units can also impart heat resistance and strength to the copolymer by the cohesive force and hardness of para-methylstyrene itself. To obtain such an effect, para-methylstyrene is preferably contained in the copolymer in amounts of greater than zero, preferably about 1 to 20 parts by weight based on the total amount of the copolymer. When the amount of para-methylstyrene is smaller than 1 part by weight, the cohesive force is insufficient and it becomes difficult to obtain enough adhesion to endure practical use. On the other hand, when the amount of para-methylstyrene is larger than 20 parts by weight, the flexibility is drastically lowered and the adhesion as an important characteristics of the adhesive disappears and, therefore, it becomes impossible to refer to it as a pressure-sensitive adhesive any longer.

The polyisobutylene may be halogenated or non-halogenated and may be of the structure:

IV

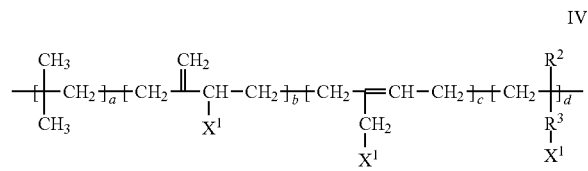

wherein the subscripts a to d represent the number of repeat units of the constituent monomer units, a is at least 20, and at least one of b, c and d are at least one, $R^2$ is H or $CH_3$, and $R^3$ is an alkenyl group, an arylene group or combination thereof, and $X^1$ is a halogen atom such as a bromine (for halogenated polyisobutylenes) or H (for non-halogenated polyisobutylenes). The subscripts "b" and "c" or "d" are chosen such that the copolymer comprises 1 to 20 wt. % of the respective monomer units e.g. b, c and d are such that the monomer units comprise 1 to 20 wt. % of the copolymer. In Formula IV each of subscripts b, c and d may be replaced by subscripts b*, c* and d* that represent the fraction of the b, c and d (respectively) monomer units substituted by the pendent halogen atom. The degree of halogen substitution is such that b*+c*+d* is generally 1 to 5 wt. % of the polymer. It will be understood that the polymer may contain both halogen-substituted monomer units (b*, c* and d*) as well as non-halogen substituted monomer units (a, b, c and d).

The addition reaction scheme involves a free radical addition between a halogenated polyisobutylene and cyclic anhydride monomer, such as maleic anhydride as illustrated in Scheme 1 below with a isobutylene bromomethyl styrene copolymer wherein $X^1$ is a halide, a is at least 20, and b is at least one.

Scheme 1

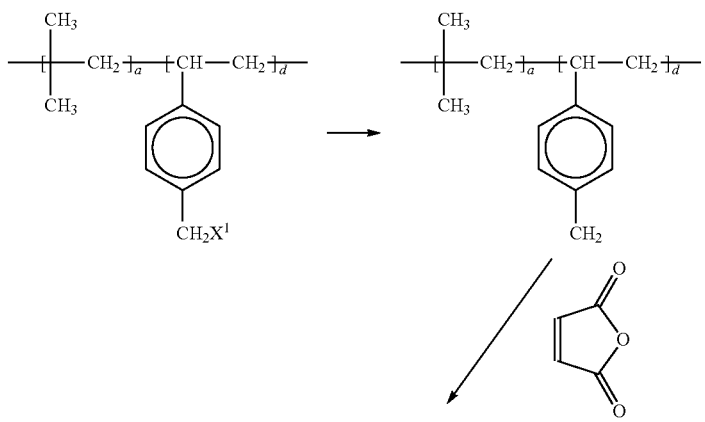

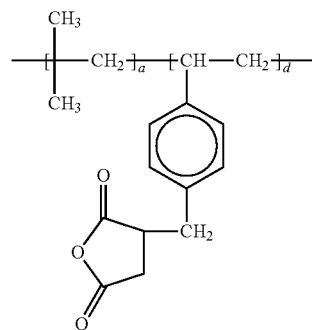

Alternatively, a non-halogenated polyisobutylene, such as a butyl rubber, may be treated with a free radical initiator to generate free radical on the polymer chain, and subsequently treated with maleic anhydride. With respect to the polyisobutylene of Formula III, typically the allylic or benzylic positions of monomer units b, c and/or d are free-radically substituted. As previously described, a potion of the pendent cyclic anhydride groups may be modified with the monoamine-terminated polysiloxane of Formula V.

The non-halogenated (e.g. PIB) synthetic rubber material can be a homopolymer, copolymer, or a mixture thereof. Copolymers can be random or block copolymers. Block copolymers can include the polyisobutylene sections in the main backbone, in a side chain, or in both the main backbone and a side chain of the polymeric material. The polyisobutylene material is typically prepared by polymerizing isobutylene alone or by polymerizing isobutylene plus additional ethylenically unsaturated monomers in the presence of a Lewis Acid-catalyst such as aluminum chloride, boron trichloride (with titanium tetrachloride as a cocatalyst), or boron trifluoride.

Non-halogenated polyisobutylene materials are commercially available from several manufacturers. Homopolymers are commercially available, for example, under the trade designation OPPANOL (e.g., OPPANOL B10, B15, B30, B50, B100, B150, and B200) from BASF Corp. (Florham Park, N.J.). These polymers often have a weight average molecular weight ($M_w$) in the range of about 40,000 to 4,000,000 grams per mole. Still other exemplary homopolymers are commercially available from United Chemical Products (UCP) of St. Petersburg, Russia in a wide range of molecular weights. For example, homopolymers commercially available from UCP under the trade designation SDG have a viscosity average molecular weight ($M_v$) in the range of about 35,000 to 65,000 grams per mole. Homopolymers commercially available from UCP under the trade designation EFROLEN have a viscosity average molecular weight ($M_v$) in the range of about 480,000 to about 4,000,000 grams per mole. Homopolymers commercially available from UCP under the trade designation JHY have a viscosity average molecular weight in the range of about 3000 to about 55,000 grams per mole.

As previously described, the free radical addition is complex. The nominal substitution product is at the benzylic carbon as shown, however the succinyl group may be substituted at any of the aliphatic carbon atoms shown in Scheme 1. It will be appreciated that the reaction product may further comprise such free radical substitution products that result from hydrogen abstraction of the depicted aliphatic hydrogen atoms, pendent homo-polymers or oligomers of maleic anhydride, and pendant succinyl groups resulting from β-scission. Reference may be made to S. Ranganathan et al., J. Poly, Chem., Part A, Vol. 36, 3817-3825 (1999), H. J. M. de Groot et al., Macromol., Vol. 29, 1151-1157 (1996), H. Huang et al., Polymer, Vol 42, 5549-5557 (2001) and M. Abbate, et al., Journal of Applied Polymer Science, 58: 1825-1837 (1995)

Any conventional free radical initiator may be used to generate the initial radical. Examples of suitable thermal initiators include peroxides such as benzoyl peroxide, dibenzoyl peroxide, dilauryl peroxide, cyclohexane peroxide, methyl ethyl ketone peroxide, hydroperoxides, e.g., tert-butyl hydroperoxide and cumene hydroperoxide, dicyclohexyl peroxydicarbonate, 2,2,-azo-bis(isobutyronitrile), and t-butyl perbenzoate. Examples of commercially available thermal initiators include initiators available from DuPont Specialty Chemical (Wilmington, Del.) under the VAZO trade designation including VAZO™ 64 (2,2'-azo-bis(isobutyronitrile)) and VAZO™ 52, and Lucidol™ 70 from Elf Atochem North America, Philadelphia, Pa.

The initiator is used in an amount effective to facilitate free radical addition of the monomer and the amount will vary depending upon, e.g., the type of initiator and the molecular weight of the polymer and the degree of functionalization desired. The initiators can be used in amounts from about 0.001 part by weight to about 1 parts by weight based on 100 parts isobutylene copolymer.

In one embodiment, the free radical addition polymer may comprise a solution polymerization method, whereby the monomer and the isobutylene polymer, and a suitable inert organic solvent are charged into a reaction vessel and then purged with nitrogen to create an inert atmosphere. Once purged, the solution within the vessel is optionally heated, the initiator is added, and the mixture is stirred during the course of the reaction.

Reactive extrusion, such as the continuous free radical polymerization methods described in U.S. Pat. Nos. 4,619,979 and 4,843,134 (both Kotnour et al., both incorporated herein by reference), may also be utilized to prepare the adhesives of the disclosure. Reactive extrusion is a solventless technology where the free radical addition is initiated by thermal means. The monomer and isobutylene polymer and the initiator are fed to an extruder. The temperature along the extruder is varied to control the free radical addition. Chain transfer agents are added to control the molecular weight and prevent gel formation. The functionalized polymer obtained at the end of the extruder may then be hot melt coated on to a suitable substrate.

The monomer units having pendent cyclic anhydride groups may be derived from halogenated butyl rubber and are of the general formula V:

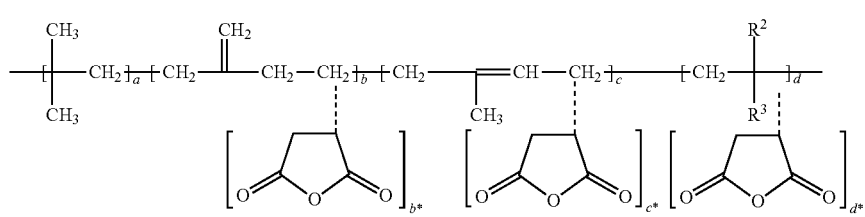

wherein a is at least 20, and at least one of b, c and d are at least one, $R^2$ is H or $CH_3$, and $R^3$ is an alkyl group, an aryl group or combination thereof. The subscripts b*, c* and d* represent the fraction of the b, c and d (respectively) monomer units substituted by the pendent cyclic anhydride group (succinyl group). It may be noted that the succinyl group is not shown as bonded to any particular carbon, as result of α-cleavage and β-scission, but may be attached to any nontertiary carbon atom. Generally the succinyl group is attached to a benzylic or allylic carbon atom and a mixture of free-radical substitution products results. Further, with regard to Formulas I and II, the subscripts "b" and "c" or "d" are chosen such that the copolymer comprises 1 to 20 wt. % of the respective monomer units: e.g. b and c are such that the -Q-Z monomer units comprise 1 to 20 wt. % of the copolymer. The degree of substitution is such that a*+b*+c*+d* is 1 to 5 wt. %. As previously described, a portion of the pendent cyclic anhydride groups may be modified with a monoamine-terminated polysiloxane of Formula V.

As a result of β-scission, the pendent succinyl group (derived from the cyclic anhydride monomer) may be represented as:

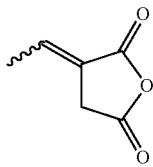

In some preferred embodiments, the cyclic anhydride-substituted polyisobutylene copolymer may be represented as

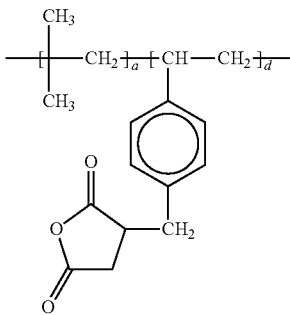

where a is at least 20, d is at least 1. Preferably d is chosen to comprise 1 to 20 wt. % of the copolymer. As previously described, a portion of the pendent cyclic anhydride groups may be reacted with a monoamine-terminated polysiloxane of Formula V.

The copolymer of Formula I is generally prepared by free radical addition of an α,β-unsaturated anhydride to a commercially available halogenated PIBs, including halogenated poly(isobutylene-co-methylstyrene), halogenated poly(isobutylene-co-isoprene). Alternatively, a non-halogenated PIB-based material may be halogenated, then subsequently substituted by free radical addition. The halogen moiety in those materials allows introduction of the pendent anhydride groups. Alternately, a non-halogenated polyisobutylene may be used.

Examples of anhydride functional polymers suitable for use include styrene maleic anhydrides (sma), poly(methyl vinyl ether-co-maleic anhydride) (such as Gantrez AN 119 available from ISP), polybutadiene grafted with maleic anhydride (such as the "Ricon MA" product line from Sartomer and the "Lithene" product line from Synthomer) and combinations thereof.

The present disclosure further provides pressure sensitive adhesive compositions that comprise a cyclic anhydride copolymer, a diamine-terminated polysiloxane, optionally a monoamine-terminated polysiloxane, and a silicate tackifier resin, known as "MQ resins".

MQ silicate resins useful in the present adhesive composition include those composed of the structural units M, D, T, Q, and combinations thereof. For example, MQ silicate resins, MQD silicate resins, and MQT silicate resins that also may be referred to as copolymeric silicate resins and that preferably have a number average molecular weight of about 100 to about 50,000, more preferably about 500 to about 10,000 and generally have methyl substituents. Silicate resins include both nonfunctional and functional resins, the functional resins having one or more functionalities including, for example, silicon-bonded hydrogen, silicon-bonded alkenyl, and silanol.

MQ silicone resins are copolymeric silicone resins having $R^3_3SiO_{1/2}$ units (M units) and $SiO_{4/2}$ units (Q units), where $R^3$ is an alkyl or aryl group, and most frequently a methyl group.

Such resins are described in, for example, Encyclopedia of Polymer Science and Engineering, vol. 15, John Wiley & Sons, N.Y., 1989, pp. 265 to 270, and U.S. Pat. No. 2,676,182 (Daudt et al.); U.S. Pat. No. 3,627,851 (Brady); U.S. Pat. No. 3,772,247 (Flannigan); and U.S. Pat. No. 5,248,739 (Schmidt et al.), the disclosures of which patents are incorporated herein by reference. MQ silicone resins having functional groups are described in U.S. Pat. No. 4,774,310 (Butler), which describes silyl hydride groups, U.S. Pat. No. 5,262,558 (Kobayashi et al.), which describes vinyl and trifluoropropyl groups, and U.S. Pat. No. 4,707,531 (Shirahata), which describes silyl hydride and vinyl groups, the disclosures of which are incorporated herein. The above-described resins are generally prepared in solvent. Dried or solventless MQ silicone resins are prepared as described in U.S. Pat. No. 5,319,040 (Wengrovius et al.); U.S. Pat. No. 5,302,685 (Tsumura et al.); and U.S. Pat. No. 4,935,484 (Wolfgruber et al.); the disclosures of which are incorporated herein by reference.

MQD silicone resins are terpolymers having $R^3_3SiO_{1/2}$ units (M units) and $SiO_{4/2}$ units (Q units) and $R^3_2SiO_{2/2}$ units (D units) as described, e.g., in U.S. Pat. No. 5,110,890 (Butler), the disclosure of which is incorporated herein by reference and Japanese Kokai HE 2-36234.

MQT silicone resins are terpolymers having $R^3_3SiO_{1/2}$ units (M units), $SiO_{4/2}$ units (Q units), and $R^3SiO_{3/2}$ units (T units) such as are taught in U.S. Pat. No. 5,110,890, incorporated herein by reference.

Commercially available silicate resins include SR-545, MQ resin in toluene, available from Momentive Inc., Columbus, Ohio; MQOH resins which are MQ silicate resins in toluene, available from PCR Inc., Gainesville, Fla.; MQR-32-1, MQR-32-2, and MQR-32-3 resins which are MQD resin in toluene, available from Shin-Etsu Chemical Co. Ltd., Torrance, Calif.; and PC-403, hydride functional MQ resin in toluene available from Rhone-Poulenc, Latex and Specialty Polymers, Rock Hill, S.C. Such resins are generally supplied in organic solvent and may be employed in compositions of the present invention as received. However, these organic solutions of silicate resin may also be dried by any number of techniques known in the art, such as spray drying, oven drying, steam drying, etc. to provide a silicate resin at about 100% nonvolatile content for use in compositions of the present invention. Also useful in compositions of the present invention are blends of two or more silicate resins.

In adhesive compositions, the MQ tackifying resin is typically present in the pressure sensitive adhesive composition in an amount sufficient to impart a degree of adhesive tack to the cured composition at the use temperature Generally the MQ resin is used in amounts of from about 20 to 200 parts by weight, preferably from about 50 too 200 parts by weight, relative to 100 parts by weight of the diamine-terminated polysiloxane. Generally above 200 parts by weight the Tg of the composition is too high for normal processing. When used as a release coating, generally no tackifier is used.

The silicone-based pressure sensitive adhesive compositions may also be prepared by a variety of processes. The compositions may be prepared in a solvent-based process, a solventless process or a combination thereof.

In solvent-based processes, the MQ silicate resin, if used, can be introduced before, during or after the reactants used to form the crosslinked composition, maleic anhydride copolymer and an amine-terminated polysiloxane, have been introduced into the reaction mixture. The reaction may be carried out in a solvent or a mixture of solvents. The solvents are preferably nonreactive with the reactants. The starting materials and final products preferably remain completely miscible in the solvents during and after the completion of the polymerization. These reactions can be conducted at room temperature or up to the boiling point of the reaction solvent. The reaction is generally carried out at ambient temperature up to 50° C. Additionally, the adhesive polymer may be prepared in a solvent mixture with the MQ resin added later, after the polymer has been formed.

In substantially solventless processes, the reactants used to form the adhesive polymer and the MQ silicate resin, if used, are mixed in a reactor and the reactants are allowed to react to form the silicone polymer, and thus form the pressure sensitive adhesive composition. Additionally, the silicone polymer can be made in a solventless process, in for example a mixer or extruder, and either be isolated or simply transferred to an extruder and mixed with MQ silicone resin.

One useful method that includes a combination of a solvent-based process and a solventless process includes preparing the silicone polymer using a solventless process and then mixing the silicone polymer with the MQ resin solution in a solvent. The optically clear stretch releasing pressure sensitive adhesive may be in the form a film. Such a film may be free standing or may be disposed on a substrate. The substrate may be a release liner, a rigid surface, a tape backing, a film, or a sheet. The pressure sensitive adhesive film can be prepared using a variety of common methods for preparing pressure sensitive adhesive films. For example, the pressure sensitive adhesive composition can be coated onto a release liner, coated directly onto a substrate or a backing, or formed as a separate layer (e.g., coated onto a release liner) and then laminated to a substrate. In some embodiments the pressure sensitive adhesive film is a transfer tape, i.e. it is disposed between two release liners. In some embodiments it may be desirable to impart a microstructured surface to one or both major surfaces of the adhesive. It may be desirable to have a microstructured surface on at least one surface of the adhesive to aid air egress during lamination. If it is desired to have a microstructured surface on one or both surfaces of the adhesive film, the adhesive coating or film may be placed on a tool or a liner containing microstructuring. The liner or tool can then be removed to expose an adhesive film having a microstructured surface.

In a particularly useful embodiment, a portion of the cyclic anhydride groups of the anhydride copolymer are reacted with the optional monoamine-terminated polysiloxane. This modified anhydride copolymer to enhance the solubility and compatibility with the diamine-terminated polysiloxane, and obviates the need for heat or solvents. The anhydride copolymer comprises unreacted anhydride groups and monoamine-terminated polysiloxane modified anhydride groups.

As previously noted, the curable composition requires no catalyst or accelerant such as are commonly used in curable siloxanes. However, if desired, a catalyst or accelerant may be added. Such catalysts may include tertiary amines, imidazole compounds, or other Lewis bases.

The tertiary amine may be mono-, di-, or polyamine. The amines may be polymeric compounds having terminal or pendent tertiary amino groups. It is of course possible to use tertiary amines containing a mixture of alkyl groups. The tertiary amine can contain more than one tertiary amine moiety. It may also contain other functional groups provided that those other functional groups do not interfere with the required reaction, or the functional groups participate beneficially in the required reaction. An example of a functional group that does not interfere is an ether group.

Useful tertiary amines include, for example, N-methyl morpholine, bis-(2-dimethylaminoethyl)ether, 1-methyl-4-dimethylaminoethyl piperazine, dimethyl benzylamine, triethylamine, methyldiethylamine, trimethylamine, phenylmethylethylamine, dimethylpropylamine, pyridine, 10-dimethylaminopyridine, imidazoles such as 2-ethylimidazole and 2-ethyl-4-methylimidazole, guanidines such as tetramethyl guanidine; 1,3,5-tris(dimethylaminopropyl) hexahydro-s-triazine, pentamethyldipropylenetriamine, pentamethyldiethylenetriamine, dimethylcyclohexylamine, 1,8-diazabicyclo(5,4,0)-undec-7-ene (DBU), 1,4-diazabicyclo(2,2,2)octane, tetraethyltriethylene diamine, methylenebis(cyclohexyl amine), N,N,N,N-tetrabutyl ethylenediamine, tetramethylenethylene diamine, dipiperidinomethane, tetramethyldiaminomethane and pentamethyldiethylene triamine and the like. Suitable polymeric amines include those tertiary amine derived from polyvinylamine, polyethylenediamine, polypropylenediamine and polyallylamine.

The optional tertiary amine may be added in amounts of 0.01 to 5 parts by weight relative to 100 parts by weight of the diamine-terminated polysiloxane.

In some embodiments the pressure sensitive adhesive film comprises a single layer. In other embodiments the pressure sensitive adhesive film comprises multiple layers, i.e. additional layers are present in addition to the pressure sensitive adhesive. Where multiple layers are present, the additional layers may be films, foams, or additional elastomers or pressure sensitive adhesives.

In some embodiments the pressure sensitive adhesive can be in the form of a tape disposed on a backing. The backing can include single layer and multi-layer constructions. Useful backings include, e.g., a polymeric foam layer, a polymeric film layer, and combinations thereof, provided such backings have the proper optical and extensibility properties.

Potentially useful polymeric backing materials are disclosed in U.S. Pat. No. 5,516,581 (Kreckel et al.) and PCT Publication No. WO 95/06691. Representative examples of potentially useful polymeric backing materials for polymeric foam layers or solid polymeric film layers include polyolefins, e.g., polyethylene, including high density polyethylene, low density polyethylene, linear low density polyethylene, and linear ultra low density polyethylene, polypropylene and polybutylenes; vinyl copolymers, e.g., polyvinyl chlorides, both plasticized and unplasticized, and polyvinyl acetates; olefin copolymers, e.g., ethylene/methacrylate copolymers, ethylene/vinylacetate copolymers, acrylonitrile-butadiene-styrene copolymers, and ethylene/propylene copolymers; acrylic polymers and copolymer; and combinations thereof. Mixtures or blends of any plastic or plastic and elastomer materials, such as polypropylene/polyethylene, polyurethane/polyolefin, polyurethane/polycarbonate, and polyurethane/polyester, can also be used.

Polymeric foams can be selected to optimize tape properties such as conformability and resiliency, which are useful when the tape is to be adhered to surfaces having surface irregularities, e.g., painted wallboard. Conformable and resilient polymeric foams are well suited for applications in which the adhesive tape is to be adhered to surfaces having surface irregularities. Such is the case with a typical wall surface. Polymeric foam layers for use in the backing generally will have a density of about 2 to about 30 pounds per cubic foot (about 32 to about 481 kg/m$^3$), particularly in tape constructions where the foam is to be stretched to effect debonding. Where only one polymeric film or foam layer of a multi-layer backing is intended to be stretched to effect debonding, that layer should exhibit sufficient physical properties and be of a sufficient thickness to achieve that objective.

Polymeric films may be used to increase load bearing strength and rupture strength of the tape. Films are particularly well suited to applications involving adhering smooth surfaces together. A polymeric film layer typically has a thickness of about 10 micrometers (0.4 mil) to about 254 micrometers (10 mils).

The backing can include an elastomeric material. Suitable elastomeric backing materials include, e.g., styrene-butadiene copolymer, polychloroprene (i.e., neoprene), nitrile rubber, butyl rubber, polysulfide rubber, cis-1,4-polyisoprene, ethylene-propylene terpolymers (e.g., EPDM rubber), silicone rubber, silicone elastomers such as silicone polyurea block copolymers, polyurethane rubber, polyisobutylene, natural rubber, acrylate rubber, thermoplastic rubbers, e.g., styrene-butadiene block copolymers and styrene-isoprene-styrene block copolymers, and thermoplastic polyolefin rubber materials. Because of the potential difficulties of retaining optical clarity and extensibility in a multilayer construction, in many embodiments the pressure sensitive adhesive film is a single layer construction.

In some embodiments the composition may include filler. Such compositions may include at least 40 wt-%, more preferably at least 45 wt-%, and most preferably at least 50 wt-% filler, based on the total weight of the composition. In some embodiments the total amount of filler is at most 90 wt-%, preferably at most 80 wt-%, and more preferably at most 75 wt-% filler.

Fillers may be selected from one or more of a wide variety of materials, as known in the art, and include organic and inorganic filler. Inorganic filler particles include silica, submicron silica, zirconia, submicron zirconia, and non-vitreous microparticles of the type described in U.S. Pat. No. 4,503,169 (Randklev).

Filler components include nanosized silica particles, nanosized metal oxide particles, and combinations thereof. Nanofillers are also described in U.S. Pat. No. 7,090,721 (Craig et al.), U.S. Pat. No. 7,090,722 (Budd et al.), U.S. Pat. No. 7,156,911 (Kangas et al.), and U.S. Pat. No. 7,649,029 (Kolb et al.).

Fillers may be either particulate or fibrous in nature. Particulate fillers may generally be defined as having a length to width ratio, or aspect ratio, of 20:1 or less, and more commonly 10:1 or less. Fibers can be defined as having aspect ratios greater than 20:1, or more commonly greater than 100:1. The shape of the particles can vary, ranging from spherical to ellipsoidal, or more planar such as flakes or discs. The macroscopic properties can be highly dependent on the shape of the filler particles, in particular the uniformity of the shape.

In some embodiments, the composition preferably comprise a nanoscopic particulate filler (i.e., a filler that comprises nanoparticles) having an average primary particle size of less than about 0.100 micrometers (i.e., microns), and more preferably less than 0.075 microns. As used herein, the term "primary particle size" refers to the size of a non-associated single particle. The average primary particle size can be determined by cutting a thin sample of hardened composition and measuring the particle diameter of about 50-100 particles using a transmission electron micrograph at a magnification of 300,000 and calculating the average. The filler can have a unimodal or polymodal (e.g., bimodal) particle size distribution. The nanoscopic particulate material typically has an average primary particle size of at least about 2 nanometers (nm), and preferably at least about 7 nm. Preferably, the nanoscopic particulate material has an average primary particle size of no greater than about 50 nm, and more preferably no greater than about 20 nm in size. The average surface area of such a filler is preferably at least about 20 square meters per gram (m$^2$/g), more preferably, at least about 50 m$^2$/g, and most preferably, at least about 100 m$^2$/g.

Optionally, compositions may contain solvents (e.g., alcohols (e.g., propanol, ethanol), ketones (e.g., acetone, methyl ethyl ketone), esters (e.g., ethyl acetate), other nonaqueous solvents (e.g., dimethylformamide, dimethylacetamide, dimethylsulfoxide, 1-methyl-2-pyrrolidinone)), and water.

If desired, the compositions can contain additives such as indicators, dyes, pigments, inhibitors, accelerators, viscosity modifiers, wetting agents, buffering agents, radical and stabilizers, and other similar ingredients that will be apparent to those skilled in the art.

EXAMPLES

Compositions are given in parts of a component, e.g., tackifier, crosslinker, per 100 total parts of a silicone polymer. The silicone polymer may be one polymer or a mixture of two or more polymers. The words copolymer and polymer may be used interchangeably.

Adhesive Test Methods:
180° Peel Adhesion Test

The peel adhesion test was conducted to estimate the force necessary to peel an adhesive tape from a substrate. The test was conducted using a 180° peel angle on an IMASS SP-200 slip/peel tester (available from IMASS, Inc., Accord Mass.) at a peel rate of 305 mm/minute (12 inches/minute). Sample tapes were prepared for testing by laminating the tapes onto a substrate panel of either PP (polypropylene test panel; Plastics International, Eden Prairie, Minn.) or a glass (glass test panel made from soda lime float glass, Brin Northwestern Glass, Minneapolis Minn.). Test panels were prepared by wiping them with a tissue wetted with isopropanol using heavy hand pressure to wipe the panel 8-10 times. This procedure was repeated two more times using clean tissues wetted with solvent. The cleaned panels were allowed to air dry for 30 minutes. The adhesive tape samples were cut into strips measuring 1.27 cm by 20 cm (½ in.×8 in.) and the strips were rolled down onto the cleaned panel with two passes of 2.0 kg (4.5 lb.) rubber roller. The prepared samples were stored at 23° C./50% RH for 24 hours before testing. The peel strengths are expressed in oz/in (or g/in), and values were the average result of two repeated experiments. The modes of failure were recorded as clean removal of the adhesive from the panel; cohesive in which the part of the adhesive remained on the panel and part was removed with the backing; and removal from backing 90° Peel Adhesion Test Preparation of test samples and the procedure for this test are the same as those for the 180° Peel Adhesion Test except that the tape was removed at a 90° peel angle.

Static Shear Strength Test

Static shear strength provides an indication of the holding power of an adhesive. The test was conducted at 23° C./50% RH (relative humidity) using a 1 Kg load. A tape test sample was prepared by adhering a 1.27 cm×15.24 tape to a 3.81 cm by 5.08 cm stainless steel (SS) panels cleaned according to the procedure described in the peel adhesion test. The tapes were rolled down with 2 passes of a 2.0 kg rubber roller and the tape overlapping the panel by 1.27 cm×2.54 cm. The portion of the tape that was not adhered to the panel was folded over itself on the adhesive side, and then folded again. A hook was hung in the second fold and secured by stapling the tape above the hook. The weight was attached to the hook and the panels were hung in a 23° C./50% RH room. The time to failure in minutes was recorded. If no failure was observed after 10,000 minutes, the test was stopped and a value of 10,000+ minutes was recorded. Failure modes were recorded if the test failed before 10,000 minutes. Failure modes were the same as those for the peel adhesion test, and also included slippage in which the tape with the weight slips off of the panel.

Probe-Tack Test

The Probe-Tack test provides an indication of the tackiness of the adhesive. High tack is generally desirable for an adhesive tape to bond quickly and aggressively to a substrate. The test is conducted on a TA.XT PLUS TEXTURE ANALYZER system (Stable Micro Systems Ltd., UK). A test sample was prepared by cutting 2.54 cm×12.7 strip of adhesive tapes and attaching them to a metal fixture (Part TA-303: Indexable PSA plate with ten 9 mm openings using TA-57R for PSA tapes). A 6 mm diameter hemispherical probe made of stainless steel was used. The probe was brought into contact at a speed of 0.5 mm/s, with the adhesive surface exposed through one of the openings. The probe was allowed to compress the adhesive with a constant force of 500 g for 1 minute, and then detached from the adhesive at a speed of 0.05 mm/s. The maximum force in grams during debonding stage was recorded.

Release Coating Test Methods

Release Test

The release test vas conducted to estimate how easily an adhesive tape can be peeled from a release liner. A 2.5 cm by 15.2 cm strip of test tape (Scotch™ Book Tape 845 available from 3M Company, St. Paul Minn.) was adhered to a sample release liner and rolled down with 2 passes of a 2.0 kg rubber roller, taking care to avoid trapping air bubbles. Samples of liner with the adhesive tape were aged at two different conditions for 3 days before testing for peel adhesion. The first sample was aged in an oven set at 70° C. for 3 days, and the second sample was aged at CTH (constant temperature of 25° C. and 50% relative humidity) for 3 days. The adhesive tapes were then peeled from the liner at an angle of 180° at a rate of 230 cm/min (90 inches/min) using the IMass model SP2000 peel tester described for 180° peel adhesion. Each of the reported values expressed in grams/inch (g/in), was the average result of three tests.

Re-Adhesion Test

The re-adhesion test was conducted to determine the decrease in the strength of an adhesive coated tape after it had been aged on a release liner. The test was measured the adhesion to a glass test panel. Liner samples with tape were prepared and aged at two different conditions according to the procedure described for the Release Test. Each of the adhesive tapes strips were removed from the liner and attached to a glass surface that had been cleaned with three washes of heptane. (Heptane was squirted onto the glass plate, wiped with a tissue (Kimberly-Clark® KimWipes™), and dried for 3-5 minutes. The procedure was repeated 2 more times with drying after each wiping step.) The tapes were rolled down with 2 passes of a 2.0-kg roller. A control sample of tape from the roll (Scotch™ Book Tape 845) was adhered to the glass in the same manner without pre-aging of the tape on a liner. The adhesive tapes were then peeled from the liner at an angle of 180° at a rate of 230 cm/min (90 inches/min) using the IMass model SP2000 peel tester described for 180° peel adhesion. Each of the reported values expressed in grams/inch (g/in), was the average result of three tests.

Gel Content

The gel content quantifies the amount of uncured silicone that on the release liner. In the test the coating weight of the silicone coating (W1) was determined using an Oxford X-ray fluorescence Analyser; Oxford Instruments, PLC; Concord Mass. The values were reported in grains/4 inches by 6 inches. The sample was then soaked in toluene for 5 minutes and dried in a vacuum oven at 70° C. until a constant weight was achieved. The sample was weighed again on the analyser to determine W2. The Gel Content was calculated using the following formula:

$$\text{Gel Content (\% wt)} = ((W1-W2)/W1) \times 100$$

Materials Used for Examples

SMA—cyclic anhydride crosslinker (Copolymer of Styrene and Maleic Anhydride; CAS 9011-13-6; MA content=25%; MW—1,900 g/mol; Tm 122° C.; Acid number 275; Sigma Aldrich, St. Louis Mo.)

DF-DMS—di-functional amine terminated polydimethylsiloxane (Aminopropyl terminated Polydimethylsiloxane, product number DMS A32; CAS 106214-84-0; viscosity—1800-2200 centistokes; MW—27000 g/mol; Gelest, Morrisville Pa.)

MF-DMS—mono-functional amine terminated polydimethylsiloxane; MW—23,500 g/mol, (prepared according to the procedure described below)

Plasticizer—silicone fluid (PMX-200 Silicone Fluid; Xiameter, Midland, Mich.)

MQ resin—MQ resin tackifier sold under the trade name MQ resin powder 803 TF; co-hydrolysis product of tetraalkoxy silane (Q unit) and trimethyl-ethoxy silane (M unit) with M:Q ratio of approximately 0.67 (Wacker Chemie AG; Munchen Germany)

THF—Tetrahydrofuran; CAS 109-99-9 (OmniSolv)

Toluene—CAS 108-88-3 (OmniSolv High purity grade)

Polyester liner—Hostaphan™ 3SAB—polyester film, primed for silicone coatings (Mitsubishi, Greer S.C.)

Preparatory Example

Preparation of Monofunctional Amine Terminated Polydimethylsiloxane

A stock solution was prepared by dissolving 50% hexamethylcyclotrisiloxane (Gelest Inc.; Morrisville Pa.) in inhibitor-free THF (THF-EMD Chemicals; Gibbstown N.J.), and dried over activated molecular sieves. Under an atmosphere of nitrogen, 681.90 g of this stock solution was transferred to a 1 L bottle, and 1.64 g of lithium trimethylsilanolate (Gelest Inc.; Morrisville Pa.) was added. The bottle was sealed and placed on a roller mill for 60 hours, and then bottle was uncapped and 2.54 g of 3-aminopropyldimethylfluorosilane (Gelest Inc.; Morrisville Pa.) was added under a nitrogen atmosphere. The bottle was recapped and rolled for 7 more hours. The solvent was evaporated on a rotary evaporator, and the resulting oil was passed through a 1.2 micron filter cartridge (1.2 micron Meissner filter cartridge; Purimetrics; Edina Minn.) under nitrogen pressure. Titration with 0.1 N HCl revealed an amine equivalent weight of 23,561 g/mol.

Example 1

Two solutions, each weighing 100 grams were prepared in glass jars for a release liner composition. The first solution contained 20% solids of a silicone gum (DMS) dissolved in toluene and the second solution contained 20% solids of a cyclic anhydride crosslinker (SMA copolymer) dissolved in an 80/20 solvent mixture of toluene/THF in a glass jar.

A release coating solution was prepared by mixing 9.5 grams of the silicone gum solution and 0.5 grams of the crosslinker solution in a glass vial. The solution in the glass vial was vigorously mixed at room temperature for 3 minutes, using a Vortex Mixer (Vortex Genie-2 Scientific Industries, Bohemia N.Y.). The resulting mixture was coated onto a polyester film (Hostaphan® 3SAB) on a roll coater. The coating was dried in an oven set at 120° C. for 30 minutes. The dry coating weight was about 0.105 grains per 24 square inches (about 0.439 grams/sq meter), with a gel content was 93%.

The coated liner was stored for 3 days at constant temperature (25° C.) and humidity (50% RH), before conducting the Release and Re-adhesion tests. Results are shown in Table 1.

TABLE 1

Release performance tests

| Example | Release Test - g/in | | Re-Adhesion Test to Glass - g/in | | |
|---|---|---|---|---|---|
| | CTH | 70° C. | Not aged | CTH | 70° C. |
| 1 | 25.0 | 139.1 | 704.3 | 471.1 | 338.6 |

Examples 2-9

Two solutions, each weighing 100 grams, were prepared in glass jars. The first solution contained 20% solids of a di-functional silicone gum (DF-DMS) dissolved in toluene, and the second contained 20% of a tackifier resin (MQ Resin) dissolved in toluene. A crosslinker solution, weighing 100 grams, was prepared containing 20% of a cyclic anhydride polymer (SMA copolymer) dissolved in an 80/20 solvent mixture of toluene/THF in a glass jar.

An adhesive coating solution was prepared by pipetting each of the three solutions into glass vials to provide a total weight of 15 grams of coating solution having the dry adhesive compositions shown in Table 1. The solution in each vial was vigorously mixed at room temperature for 10 minutes on a Vortex. The resulting mixtures were knife-coated onto a 6 inch by 25 inch strip of polyester film backing (Hostaphan® 3SAB) to a thickness of about 15 mils wet. The coated film was dried in an oven set at 70° C. for 20 minutes to provide a tape having an adhesive coating thickness of about 2 mils. The dried coated films were further heated in an oven set at 120° C. for 15 minutes. The tapes were conditioned at 23° C., 50% RH for 3 days before testing for 180° Peel Adhesion and Static Shear Strength, and the results are shown in Table 1. Examples 2-5 illustrate the effect of varying the crosslinker content (SMA) and Examples 6-9 illustrate the effect of varying the tackifier content (MQ Resin) on adhesive properties.

TABLE 2

Adhesive Compositions and Properties

| | Adhesive Composition | | | 180° Peel Adhesion (N/dm) | | Static Shear |
|---|---|---|---|---|---|---|
| Example | SMA (parts) | DMS (parts) | MQ Resin (parts) | Glass* | PP** | (min) |
| 2 | 5 | 100 | 100 | 1.1 | 3.3 | 10,000+ |
| 3 | 10 | 100 | 100 | 3.3 | 17.6 | 10,000+ |
| 4 | 15 | 100 | 100 | 4.4 | 19.8 | 10,000+ |
| 5 | 20 | 100 | 100 | 6.6 | 18.7 | 10,000+ |
| 6 | 5 | 100 | 60 | 1.1 | 2.2 | 10,000+ |
| 7 | 5 | 100 | 100 | 14.3 | 18.7 | 10,000+ |
| 8 | 5 | 100 | 140 | 37.4 | 47.3 | 10,000+ |
| 9 | 5 | 100 | 180 | 55 | 67.1 | 10,000+ |

*Failure mode—clean removal of adhesive from glass and PP panels.

Examples 10-12

Examples 10-12 were prepared, coated into tapes, and tested according to the procedure described for Examples 2-9, except that a 20% solids solution of a mono-functional silicone gum (MF-DMS) solution replaced some or all of the DF-DMS solution in the amount shown in Table 3. The silicone gum solution was prepared by dissolving 20% solids MF-DMS in toluene in a glass jar. Peel adhesion and static shear strength were tested according to the same methods described for Examples 2-9, except that the tapes were peeled at an angle of 90° instead of 180°. The Probe tack test was also conducted to show the increased tackiness of the adhesive by adding a monoamine terminated polydimethylsiloxane. Results are shown in Table 3.

TABLE 3

Adhesive Compositions

| | SMA (parts) | DF-DMS (parts) | MF-DMS (parts) | MQ Resin (parts) | 90° Peel Adhesion (N/dm) | | Static Shear (min) | Probe Tack (g) |
|---|---|---|---|---|---|---|---|---|
| Example | | | | | Glass* | PP* | | |
| 10 | 5 | 100 | 0 | 100 | 40.6 | 33.3 | 10,000+ | 7 |
| 11 | 5 | 80 | 20 | 100 | 32.0 | 34.2 | 10,000+ | 28 |
| 12 | 5 | 60 | 40 | 100 | 22.8 | 24.4 | 10,000+ | 63 |

*Failure mode—clean removal of adhesive from glass and PP panels.

Examples 13-18

Adhesive compositions were prepared, coated into tapes, and tested according to the procedure described for Examples 2-9, except that a plasticizer was added to the composition in the amounts shown in Table 4. The adhesives were coated to different thicknesses shown in Table 4, and the peel adhesion values are reported in grams/inch because of the lower values that were obtained. The plasticized formulations could be suitable for applications that require low peel adhesion such as in medical and personal care products. It was noted that while the samples did not have high shear values, the samples did not cohesively fail in the tests but rather slipped from the stainless steel panels.

TABLE 4

| | | | | | | 180° Peel Adhesion (g/in) | | Static Shear** |
|---|---|---|---|---|---|---|---|---|
| Example | SMA (parts) | DF-DMS (parts) | Plasticizer (parts) | MQ Resin (parts) | Coating thickness (mils) | Glass* | PP* | (min) |
| 12 | 5 | 100 | 100 | 180 | 3.4 | 24 | 18 | 2 |
| 13 | 10 | 100 | 100 | 180 | 3 | 15 | 14 | 1 |
| 14 | 5 | 100 | 100 | 240 | 2.8 | 50 | 36 | 11 |
| 15 | 10 | 100 | 100 | 240 | 6 | 43 | 34 | 24 |
| 16 | 5 | 100 | 140 | 240 | 15 | 43 | 29 | 2 |
| 17 | 10 | 100 | 140 | 240 | 4 | 14 | 20 | 2 |

*Failure mode—clean removal of adhesive from glass and polypropylene panels.
**Failure mode—slippage of the adhesive tape from the panel.

What is claimed is:

1. A curable composition comprising a cyclic anhydride copolymer, a diamine-terminated polysiloxane and a tackifier.

2. The curable composition of claim 1 wherein the cyclic anhydride copolymer is a free radical addition copolymer.

3. The curable composition of claim 1 wherein the cyclic anhydride copolymer is a grafted copolymer.

4. The curable composition of claim 1 wherein the cyclic anhydride copolymer is a styrene/maleic anhydride copolymer.

5. The curable composition of claim 4 wherein the styrene/maleic anhydride copolymer further comprises copolymerized monomer units selected from olefins, conjugated dienes, alkyl (meth)acrylates, vinyl acetate, (meth)acrylonitrile, (meth)acrylamides, alkyl vinyl ethers, vinyl sulphoxides and vinyl sulphones.

6. The curable composition of claim 4 containing 10-70 mole % maleic anhydride monomer units.

7. The curable composition of claim 1 wherein the diamine-terminated polysiloxane is of the formula

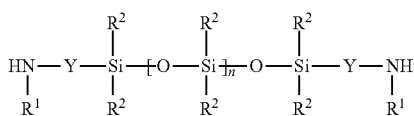

wherein
Each $R^1$ is H, an alkyl or aryl group;
Each $R^2$ is an alkyl or aryl group;
Each Y is a $C_1$-$C_{10}$ alkylene, and
n is at least 10.

8. The curable composition of claim 1 containing no catalyst.

9. A release coating comprising the cured composition of claim 1.

10. The curable composition of claim 1 comprising:
a) 100 parts by weight of the amine-terminated polysiloxane
b) 0.2 to 20 parts by weight of the cyclic anhydride copolymer.

11. The curable composition of claim 1 comprising
a) 100 parts by weight of the diamine-terminated polysiloxane,
b) 0.2 to 30 parts by weight of the cyclic anhydride copolymer, and
c) 20 to 200 parts by weight of the tackifier.

12. The curable composition of claim 1 wherein the tackifier is an MQ resin tackifier.

13. The curable composition of claim 1 further comprising a silicone plasticizer.

14. The curable composition of claim 1 further comprising particulate silica.

15. An adhesive comprising the cured composition of claim 11.

16. The curable composition of claim 1 further comprising a monoamine-terminated polysiloxane.

17. The curable composition of claim 16 wherein the monoamine-terminated polysiloxane is used in amounts of up to 60 parts by weight, relative to 100 parts by weight of the diamine-terminated polysiloxane.

* * * * *